Figure 1:
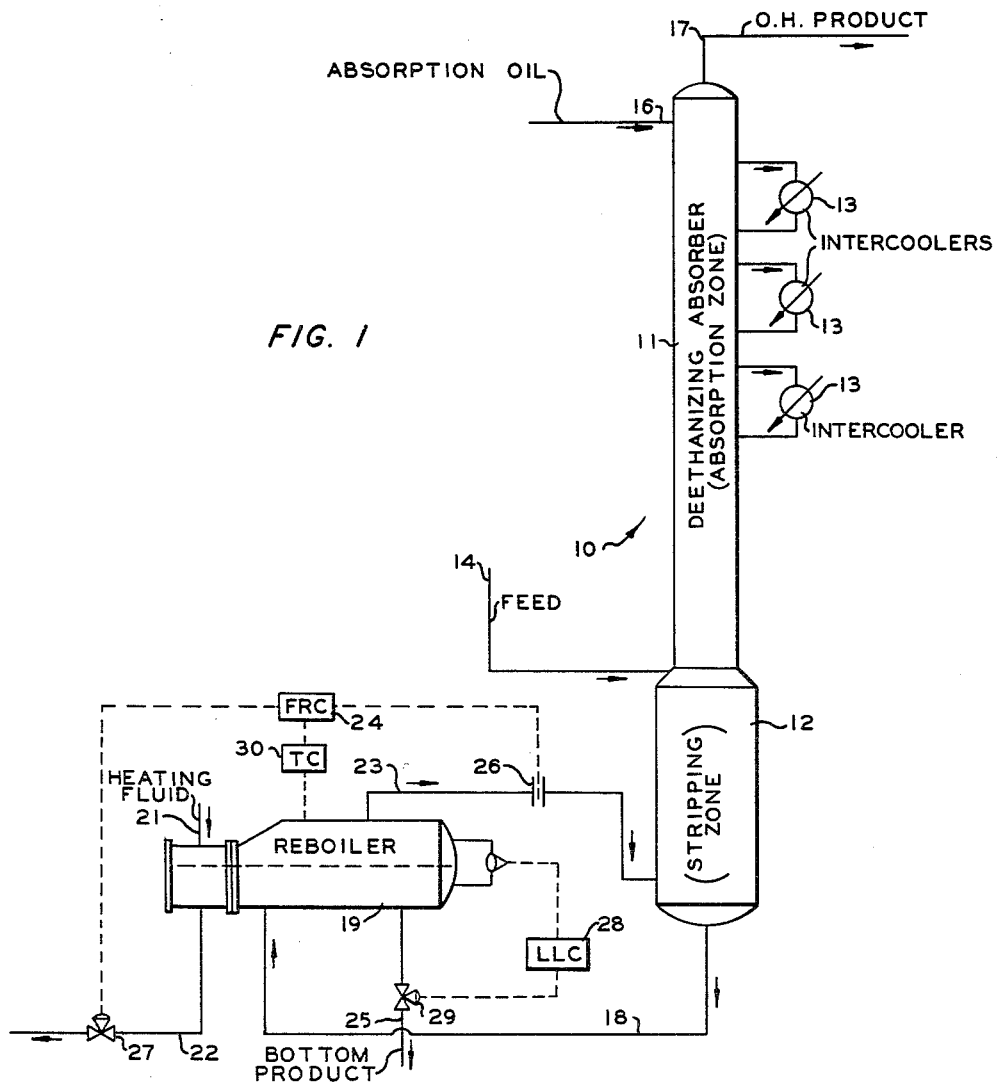

May 31, 1960 G. A. MOYER 2,938,865
SEPARATION COLUMN CONTROL
Filed Dec. 26, 1956 2 Sheets-Sheet 2

INVENTOR.
G. A. MOYER
BY Hudson and Young
ATTORNEYS

United States Patent Office 2,938,865
Patented May 31, 1960

2,938,865
SEPARATION COLUMN CONTROL

Golden A. Moyer, Okmulgee, Okla., assignor to Phillips Petroleum Company, a corporation of Delaware Filed Dec. 26, 1956, Ser. No. 630,558
8 Claims. (Cl. 208—341)

This invention relates to a method for controlling the operation of separation equipment. In one aspect, it relates to a method for controlling the operation of the lower or stripping section of a separation column. In another aspect, it relates to a system for controlling the operation of a separation column.

In the petroleum industry, the separation of hydrocarbons into light and heavy fractions is often accomplished by the use of separation columns which employ an external reboiler. The purpose of the reboiler is to supply heat to the lower or stripping section of the separation equipment. In any particular separation with a feed material of uniform quality being supplied to the equipment at a constant rate, it is necessary that a definite amount of reboiler heat be supplied if an efficient separation is to be obtained. It is seen that any column upset, such as a change in the quantity or quality of the feed material, requires an adjustment of the amount of reboiler heat supplied to the separation column. In conventional separation systems, this adjustment is generally made manually, but such an expedient is unsatisfactory because it fails to immediately correct the column upset with the result that there are periods of operation when a specification product is not being produced.

It is an object of this invention, therefore, to provide an improved method for operating the lower or stripping section of a separation column.

Another object of the invention is to provide a method of controlling the supply of reboiler heat to a separation column.

Still another object of the invention is to provide a system for controlling the rate at which reboiler heat is supplied to the stripping section of a separation column.

Other and further objects and advantages of the invention will become apparent to those skilled in the art upon consideration of the accompanying disclosure.

In accordance with the present invention, a method is provided for controlling the operation of the lower or stripping section of separation equipment. In a broad aspect, the invention resides in an improvement in a process for separating a mixed feed stream in a separation column from which at least overhead and bottom components are recovered, the improvement comprising supplying heat to the bottom components so as to provide a predetermined quantity of vapors, passing the vapors into a stripping zone in the lower portion of the separation column, and continuously adjusting the amount of heat supplied to the bottom components so as to maintain same at a predetermined temperature. By operating the separation column in this manner, the vapors are supplied to the stripping zone in a proper amount and at a desired temperature, thereby correcting for any upsets occurring in the operation of the column.

In a more specific embodiment of the invention, the bottom components from the separation zone are introduced into a heat exchange zone wherein they are passed in indirect heat exchange relation with a heat exchange fluid such as steam. As a result of the heat given up by the heat exchange fluid, the bottoms are heated, thereby causing the formation of vapors which are then passed into the stripping zone. The quantity of vapors introduced into the stripping zone in this manner are continuously measured, and the amount of heat furnished to the bottoms in the aforementioned indirect heat exchange is adjusted so as to satisfy a predetermined demand for vapors. It often happens that column upsets occur, e.g., variations in feed quality or quantity, which require an adjustment in the amount of vapors supplied to the stripping zone. Accordingly, in accordance with this invention, the temperature of the bottoms in the heat exchange zone is continuously measured and the demand for vapors adjusted in accordance with this measurement. As a result of the change in vapor demand, the amount of heat supplied to the bottom components is altered so as to meet this new demand for vapors and thereby compensate for the column upset.

In another embodiment, the invention resides in a system for controlling the operation of a separation column, which comprises an external reboiler, a reboiler vapor line connected between the reboiler and the bottom of the column, a heat input line connected to the reboiler, a flow controller operatively connected to an orifice in the reboiler vapor line and to a valve in the heat input line to the reboiler, and means for resetting the flow controller in accordance with the temperature in the reboiler.

Figure 2:
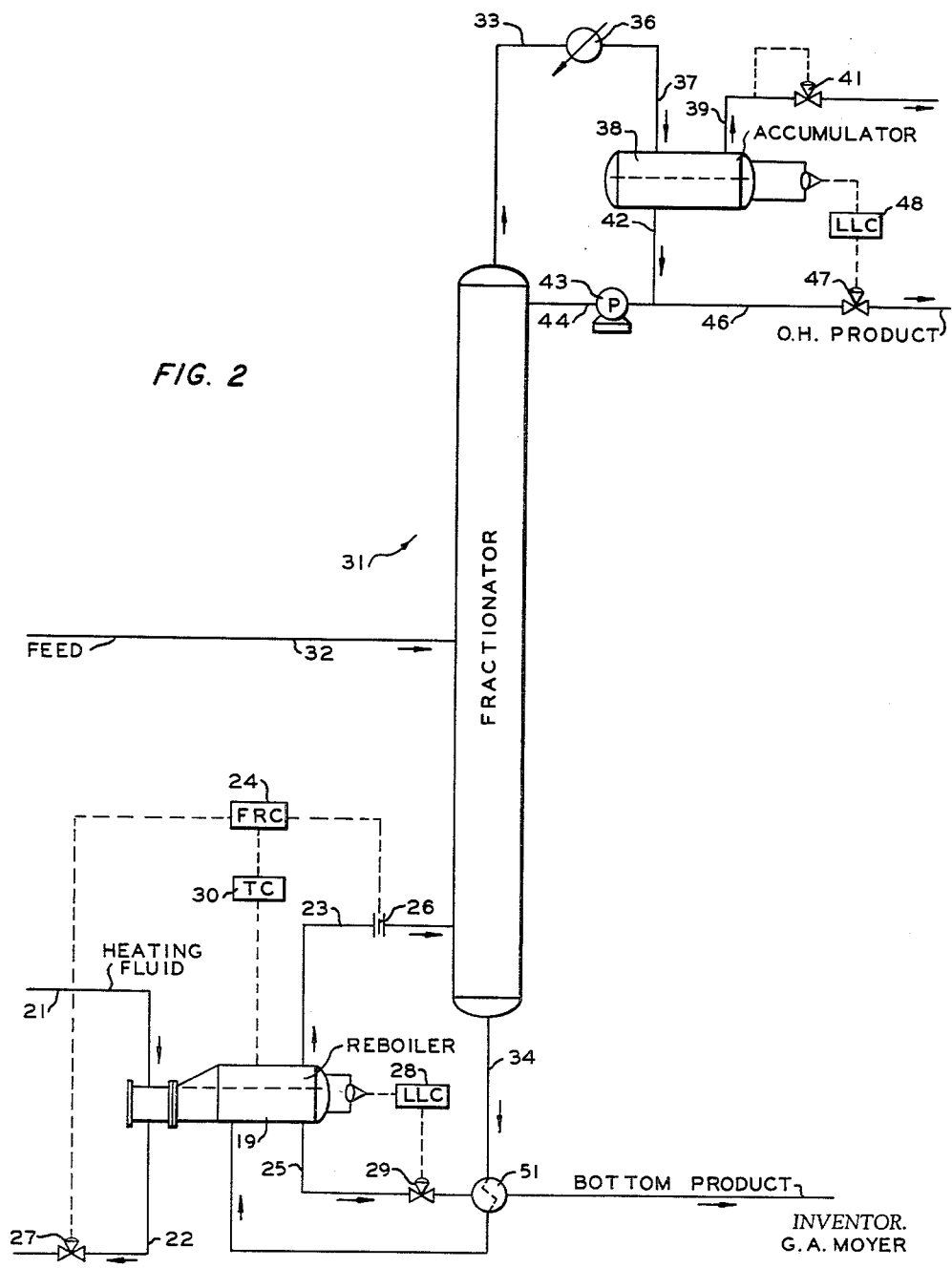

A more comprehensive understanding of the invention can be obtained by referring to the following description and the drawing, in which:

Figure 1 is a diagrammatic illustration of one modification of apparatus suitable for carrying out the present invention; and Figure 2 shows diagrammatically another modification of apparatus suitable for practicing the invention.

Referring to the drawing, and in particular to Figure 1, there is shown an absorber column 10 which for purposes of illustration will be described as a deethanizing absorber. It is to be understood, however, that it is not intended to limit the invention to any particular absorber, for the invention is, in general, applicable to any type of separation column which is provided with an external reboiler. Absorber 10 comprises an absorption zone 11 positioned in the upper part of the column and a stripping zone 12 disposed in the lower portion of the column. The absorption zone of the absorber is provided with intercoolers 13 which operate conventionally to remove absorption heat and reboil heat from the column. A suitable feed material is charged to an intermediate portion of column 10 between the stripping and absorption zones through feed inlet line 14 while line 16 provides means for introducing a suitable absorption oil into the upper portion of the column. A suitable feed for a deethanizing absorber is a compressed, wet gas obtained as the overhead from a fractionator employed to separate the yield from the catalytic cracking of a gas oil. As regards the absorbent, a suitable absorber oil in this particular operation is an unstabilized gasoline which can also be obtained from the fractionator employed with a catalytic cracking unit. In general, in the operation of any absorber, an absorption oil is utilized having a boiling range which is close to the boiling range of the material being separated from the feed material. The unstabilized gasoline which can be suitably used as the absorption oil with the deethanizing absorber has an end point of about 400° F. and contains some butane.

The absorption oil entering column 10 through line 16 flows downwardly through the column and contacts the gaseous feed material charged to the column through line 14. In contacting the feed material the absorption oil absorbs the heavier components therefrom, e.g., propane and heavier hydrocarbons, allowing ethane and lighter hydrocarbons to flow upwardly through the column. The ethane and lighter hydrocrbons so separated from the feed material are withdrawn overhead through line 17. The absorber oil which collects in the lower portion of column 10 contains the absorbed propane and heavier hydrocarbons. The absorber oil containing the absorbed components is withdrawn from the bottom of the column through line 18 and then passed into reboiler 19.

Within reboiler 19 the bottom components from column 10 are heated in order to vaporize some of the lighter components contained therein. This is accomplished by contacting the bottoms with a suitable heating fluid, such as steam, in an indirect heat exchange relationship. The heating fluid required for this purpose is charged to the reboiler through line 21 and withdrawn therefrom through line 22. The vaporous hydrocarbons which are formed in this indirect heat exchange are withdrawn from the reboiler through line 23 and then passed into stripping zone 12 of the absorber. In the stripping zone, the vapors strip the lighter hydrocarbons, such as ethane and lighter, from the absorber oil, the stripped materials then passing up through the column and being finally removed therefrom by means of line 17.

When a feed material of uniform quality is being charged to the absorber at a constant rate, a certain definite quantity of stripping vapors is required for the absorber stripping zone. In order to produce this desired quantity of stripping vapors, a certain definite temperature is also required in the reboiler. A constant desired flow of stripping vapors is maintained in line 23 through the operation of flow recorder-controller 24 which is operatively connected to an orifice 26 in line 23 and to a flow control means, such as motor valve 27, in line 22. Flow recorder-controller 24 is given an initial seting corresponding to the desired quantity of stripping vapors which it is desired to supply to stripping zone 12. The recorder-controller then functions to adjust the opening of motor valve 27 so that sufficient heat exchange fluid is supplied to the reboiler through line 21 to cause the formation of the desired amount of vapors within the reboiler. Thus, if the flow of vapors through line 23 is too low as indicated by the pressure drop across orifice 26, the recorder-controller operates to increase the opening of valve 27 and permit more heat exchange fluid to recirculate through reboiler 19. Conversely, when the quantity of vapors flowing through line 23 is greater than the setting given recorder-controller 24, this instrument functions to cut back on valve 27 and thereby decrease the circulation rate of heat exchange fluid through the reboiler. Line 25 provides means for recovering bottoms product from reboiler 19, the rate of withdrawl being controlled by liquid level controller 28 operatively connected to the reboiler and to valve 29.

When the quality and quantity of the feed material remain constant and no other column upsets occur, the flow recorder-controller functions, as described hereinbefore, to control the supply of reboiler heat to the column. However, column upsets often occur during the operation, and some adjustment is required if specification products are to be produced. In conventional separation column operations, it is customary to make certain manual adjustments, e.g., altering the rate of supply of reboiler heat to the column or changing amount of absorber oil charged, but such methods of control do not immediately compensate for column upsets and unsatisfactory products are obtained during the period required for recognition and correction of the upsets. By proceeding in accordance with the instant invention, any column upset is automatically and immediately detected and corrected so that specification products are continuously obtained.

In order to illustrate how a column upset is automatically corrected in accordance with the present invention, it is assumed that the quantity of feed material charged to the absorber column decreases. Because of the decrease in the quantity of feed material, the quantity of bottom components charged to reboiler 19 also decreases. However, recorder-controller 24 operates to increase the rate of supply of heating fluid flow to the reboiler in trying to vaporize the same quantity of stripping vapors as demanded by its initial setting. As a result of supplying this additional heat to the bottom components, a heavier vapor is necessarily produced, and the temperature of the reboiler bottoms increases. A temperature controller 30, which is operatively connected to reboiler 19 and to a pneumatic set mechanism with which flow recorder-controller 24 is provided, functions so as to maintain a desired reboiler temperature. The temperature controller is given a maximum temperature setting which the temperature of the bottom components in reboiler 19 is not to exceed. In the case of a deethanizing absorber operating at a pressure of about 225 p.s.i.g., a temperature setting of approximately 250° F., e.g., a temperature in the range of 245 to 255° F., is usually used. In general, the temperature corresponds to that at which it is desired that the stripping vapors enter the stripping zone and will depend upon the particular separation being made. Now when the temperature of the bottom components in reboiler 19 increases above this maximum setting, the temperature controller operates through the pneumatic set mechanism associated with recorder-controller 24 to reset the index setting of the recorder-controller to a lower value. In accordance with this lower setting of the index of the recorder-controller, the opening of valve 27 is decreased so as to correspond to the new index setting, thereby cutting back on the amount of heat exchange fluid supplied to the reboiler. When the amount of heating fluid to the reboiler is decreased, the temperature therein decreases to that set on temperature controller 30 and with the lower temperature in the reboiler, less vapors are produced for supply to the stripping zone. By operating in this manner, the stripping vapors are supplied to the stripping zone of the absorber column at a desired temperature and in the amount required for stripping the lighter hydrocarbons from the absorber oil contained in the stripping zone.

When the charge to the deethanizer absorber increases, it becomes necessary to supply additional vapors to the stripping zone of the absorber in order to prevent passage of ethane out of the bottom of the column. As a result of an increase in the quantity of feed material, there is an increase in the amount of bottom components supplied to the reboiler through line 18 and a concomitant decrease in reboiler temperature. This lower temperature in the reboiler is immediately detected by the temperature sensing element associated with temperature controller 30 which then functions through the cooperation of the pneumatic set mechanism to reset the index setting of flow recorder-controller 24 to a higher value. As a result of this new index setting of recorder-controller 24, motor valve 27 is given an increased opening, thereby permitting additional heating fluid to circulate through reboiler 19. Additional vapors are thus formed in reboiler 19, which then flow through line 23 into the stripping zone 12. The increase in the supply of heating fluid continues until the temperature in the reboiler returns to the desired level. In the separation of ethane from a charge material containing ethane and heavier hydrocarbons in an absorber operated at about 225 p.s.i.g., the optimum reboiler temperature is about 250° F. It is to be understood that the temperature of the reboiler will depend upon several factors, including the type of separation to be made and the pressure in the system.

When the quality rather than the quantity of the feed material varies, the control system of this invention functions in essentially the same manner as described hereinabove. For example, if the ethane content of the feed material increases, the absorber oil in flowing through the column picks up more ethane and passes with it into reboiler 19. Since the material in the reboiler is now lighter than before the change in the quality of the feed, at the same heat input to the reboiler more vapors are formed in the reboiler and then sent to stripping zone 12. This increase in vapor flow through line 23 is immediately detected by flow recorder-controller 24 which then operates to cut back on valve 27 and thereby decrease the supply of heating fluid to the reboiler. In this manner, the flow recorder-controller operates to maintain the original lower vapor flow to the absorber. However, as the supply of heating fluid to reboiler 19 decreases, the temperature in the reboiler falls below the desired temperature level. This decrease in the temperature of the material in the reboiler is detected by temperature controller 30 which in the case of ethane separation has been given a setting of about 250° F. Accordingly, temperature controller 30 resets the index setting of recorder-controller 24 to a higher setting, thereby causing this instrument to increase the opening of valve 27 and thereby cause a greater quantity of heating fluid to flow through the reboiler. The increase in the quantity of heating fluid supplied to the reboiler causes the temperature therein to return to the desired level of about 250° F. and the formation of an increased amount of vapors which flow into the stripping zone through line 23. It is, of course, realized that the increase in vapor flow results from the increase in ethane in the feed mixture charged to the absorber and that it is desired to return this material to the absorber in order that it may be ultimately recovered through line 17. When the ethane content of the feed material decreases rather than increases, the control system operates in a manner opposite to that described hereinabove, i.e., so that less heat is supplied to the reboiler and less vapors are passed to the stripping zone through line 23.

While the instant invention has been described with relation to the correction of column upsets resulting from changes in the quantity and quality of the feed material, it is to be understood that other column upsets can occur which are compensated for by the instant invention. For example, if an inter-cooler fails, less stripping vapors are required in the stripping zone. As a result, the temperature in the reboiler starts to increase at which time temperature controller 30 operates to reset flow recorder-controller 24 in the manner described hereinbefore with relation to the discussion of a decrease in the quantity of feed material charged to the column. It is to be understood also that several column upsets occurring simultaneously may compensate one another so that it may be unnecessary to alter the rate of flow of stripping vapors to the stripping zone.

While the invention has been described hereinbefore with relation to an absorber column, it is to be understood that the invention is applicable to other types of separation columns which employ an external reboiler. Thus, referring to Figure 2 of the drawing, there is illustrated a fractionator 31 with which the instant invention can be advantageously employed. In Figure 2 identical reference numerals have been employed to identify elements which have previously been described with relation to Figure 1.

In the operation of fractionating column 31, the feed material to be processed is introduced into the column through feed inlet line 32. An overhead distillate in vapor form is removed from column 31 by means of line 33 while a bottoms product is recovered from the column through line 34. The overhead vapors in line 33 are partially condensed in heat exchanger 36 after which the condensed material is passed through line 37 into overhead accumulator 38. The non-condensibles, which are recovered from accumulator 38 through line 39 containing a back pressure valve 41, are then further processed as may be desired. A portion of the condensate removed from accumulator 38 through line 42 is pumped by means of pump 43 through line 44 into the upper portion of column 31 as reflux. The remainder of the material withdrawn from accumulator 42 is recovered by means of line 46 as one product of the process. The rate at which material is recovered through line 46 is controlled by valve 47 contained in that line and operatively connected to liquid level controller 48 which is further operatively connected to accumulator 38.

The bottom components recovered from column 31 through line 34 are passed through an indirect heat exchanger 51. In indirect heat exchanger 51, the bottoms are heated by being passed in indirect heat exchange relationship with the bottoms product recovered from reboiler 19 through line 25. After passing through indirect heat exchanger 51, the bottoms material is introduced into reboiler 19. In the reboiler the bottom components are heated by indirect heat exchange with heating fluid supplied to the reboiler through line 21. As a result of this heating of the bottoms, vapors are formed which are passed into the lower portion of the fractionator through line 23 to supply heat to the column. The rate at which vapors are supplied to the fractionator is controlled by means of flow recorder-controller 24 which operates valve 27 in line 22 so as to control the rate at which heat exchange fluid is charged to the reboiler. As described hereinbefore with relation to Figure 1, a temperature controller 30 is provided, this controller being operatively connected to reboiler 19 and to a pneumatic set mechanism associated with recorder-controller 24. The temperature controller functions as previously described so as to reset recorder-controller 24 and thereby correct for any column upsets occurring during the operation of the fractionator. In this manner, the vapors are supplied to the fractionator through line 23 in a proper amount and at a desired temperature.

A more comprehensive understanding of the invention can be obtained by referring to the following illustrative example which is not intended, however, to be unduly limitative of the invention.

EXAMPLE

A deethanizing absorber similar to that shown in Figure 1 of the drawing is employed to separate ethane and lighter hydrocarbon from a feed material. The feed material charged to the absorber is a compressed, wet gas obtained as the overhead from the fractionator used to separate the yield recovered in the catalytic cracking of a gas oil. An unstabilized gasoline, which is also obtained from the fractionator of the catalytic cracking unit, is employed as the absorber oil. The feed material is charged to the absorber at the rate of 250,000 s.c.f./hour, while the absorber oil is introduced into the top of the absorber at the rate of 140 bbl./hour. The conditions under which the absorber is operated and the rate at which products are recovered therefrom are set forth hereinbelow in Table I.

Table I

Overhead, s.c.f./hr. _____ 60,000
Liquid bottom yield, bbl./hr. _____ 275
    Product _____ 135
    Absorber oil _____ 140
Stripping vapor, s.c.f./hr. _____ 120,000
Reboiler temperature, ° F. _____ 245–255
Reboiler pressure, p.s.i.g. _____ 225

After a period of several hours operation, the rate at which feed material is charged to the column changes to 200,000 s.c.f./hour with the absorber oil being charged at the same rate of 140 bbl./hour. The operating conditions and the rate at which materials are recovered from the column at this new feed rate are set forth hereinbelow in Table II.

Table II

Overhead, s.c.f./hr. _____ 48,000
Liquid bottom yield, bbl./hr. _____ 248
    Product _____ 108
    Absorber oil _____ 140
Stripping vapor, s.c.f./hr. _____ 99,000
Reboiler temperature, ° F. _____ 245–255
Reboiler pressure, p.s.i.g. _____ 225

With this decrease in feed rate, the amount of bottom components recovered from the absorber decreases, and the temperature controller operates so as to reset the flow recorder-controller. At this new setting of the recorder-controller, it is noted from Table II that stripping vapor is supplied to the absorber at the rate of 99,000 s.c.f./hr. rather than at the rate of 120,000 s.c.f./hr. However, it is also noted that the stripping vapor is supplied to the absorber at the same temperature for both feed rates.

The control instruments utilized in the practice of the instant invention can be commercially available items of manufacture. For example, in Bulletin 450 of the Foxboro Company, Foxboro, Mass., instruments are illustrated and described which can be suitably employed. Thus, the rate of flow recorder-controller, the pneumatic set mechanism, and the temperature controller can be, respectively, a Model 40 Controller, a Model 40 Pneumaticset, and a Model 40 Indicating Controller as shown on pages 52, 55 and 61 of the aforementioned Foxboro Bulletin.

As will be evident to those skilled in the art, various modifications of this invention can be made or followed in the light of the foregoing disclosure or discussion without departing from the spirit or scope of the invention.

I claim:

1. In the separation of a feed mixture in a separation column from which at least overhead and bottom components are withdrawn, the improvement comprising: passing said bottom components into a heat exchange zone; heating said bottom components in said heat exchange zone by passing same in indirect heat exchange relation with a heating fluid; passing vapors formed by said heating from said heat exchange zone into the lower portion of said column as the sole source of heat thereto; supplying heating fluid to said heat exchange zone in an amount sufficient to satisfy a given demand for vapors at a substantially constant first flow rate; continuously measuring the temperature within said heat exchange zone; and adjusting the demand for vapors from said first flow rate to a second flow rate in accordance with said temperature measurement, thereby changing the rate at which heating fluid is supplied to said heat exchange zone.

2. The improvement of claim 1 in which said first flow rate of vapors is increased when said temperature measurement decreases below a given level and said first flow rate of vapors is decreased when said temperature measurement increases above a given level.

3. In a process for treating a hydrocarbon mixture which comprises contacting said mixture with an absorbent in an absorber column and recovering at least overhead and bottom components from said column, the improvement comprising: passing said bottom components into a heat exchange zone; heating said bottom components in said heat exchange zone by passing same in indirect heat exchange relation with a heating fluid; passing vapors formed by said heating from said heat exchange zone into the lower portion of said column as the sole source of heat thereto; supplying heating fluid to said heat exchange zone in an amount sufficient to satisfy a demand for vapors at a substantially constant first flow rate; continuously measuring the temperature within said heat exchange zone; adjusting the demand for vapors from said first flow rate to a second flow rate in response to said temperature measurement; supplying heating fluid to said heat exchange zone in an amount sufficient to satisfy the adjusted vapor demand; and recovering bottom product from said heat exchange zone.

4. The improvement of claim 3 in which said hydrocarbon mixture comprises ethane, propane, and lighter and heavier gaseous hydrocarbons; said absorbent is an unstabilized gasoline; said overhead components comprise essentially ethane and lighter hydrocarbons; and said bottom components comprise essentially propane and heavier hydrocarbons.

5. The improvement of claim 4 in which the heating fluid supplied to said heat exchange zone in an amount sufficient to satisfy the adjusted vapor demand maintains the temperature within said zone in the range of 245 to 255° F.

6. In a process for treating a hydrocarbon mixture within a fractionating column from which at least overhead and bottom components are recovered and a portion of said overhead components are returned to the upper part of said column as reflux, the improvement comprising: passing said bottom components into a heat exchange zone; heating said bottom components in said heat exchange zone by passing same in indirect heat exchange relation with a heating fluid; passing vapors formed by said heating from said heat exchange zone in the lower protion of said column as the sole source of heat thereto; supplying heating fluid to said heat exchange zone in an amount sufficient to satisfy a demand for vapors at a substantially constant first flow rate; continuously measuring the temperature within said zone; adjusting the demand for vapors from said first flow rate to a second flow rate in response to said temperature measurement; supplying heating fluid to said heat exchange zone in an amount sufficient to satisfy the adjusted vapor demand; and recovering bottom product from said heat exchange zone.

7. In a system which comprises a separation column, feed inlet means attached to an intermediate portion of said column, overhead outlet means attached to an upper portion of said column, bottom outlet means attached to a lower portion of said column, an external reboiler, said reboiler being connected to said bottom outlet means, a reboiler vapor conduit means connected between said reboiler and a lower section of said column, and a heat input conduit means connected to said reboiler, the improvement comprising a flow controller operatively connected to an orifice in said reboiler vapor conduit means and to a valve in said heat input conduit means; and means for resetting said flow controller to alter said flow in response to and in inverse relation to the temperature in said reboiler.

8. In a system which comprises a separation column, feed inlet means attached to an intermediate portion of said column, overhead outlet means attached to an upper portion of said column, bottom outlet means attached to a lower portion of said column, an external reboiler, said reboiler being connected to said bottom outlet means, a reboiler vapor conduit means connected between said reboiler and a lower section of said column, and a heat input conduit means connected to said reboiler, the improvement comprising a flow controller operatively connected to an orifice in said reboiler vapor conduit means and to a valve in said heat input conduit means; means for resetting said flow controller; and a temperature controller operatively connected to said reboiler and to said means for resetting said flow controller.

References Cited in the file of this patent

UNITED STATES PATENTS

| 2,134,882 | Monro | Nov. 1, 1938 |
| 2,277,070 | Carney | Mar. 24, 1942 |
| 2,281,282 | Gerhold | Apr. 28, 1942 |
| 2,388,931 | Nelson | Nov. 13, 1945 |
| 2,638,437 | Ragatz | May 12, 1953 |
| 2,710,278 | Gilmore | June 7, 1955 |
| 2,729,588 | Hannah | Jan. 3, 1956 |
| 2,749,281 | Ferro | June 5, 1956 |